United States Patent [19]

Tsuchihashi et al.

[11] Patent Number: 4,935,811
[45] Date of Patent: Jun. 19, 1990

[54] SURFACE DEFECT INSPECTION APPARATUS WITH MICROSCOPE

[75] Inventors: Masaru Tsuchihashi; Koji Shindo; Masahiro Kajihara, all of Amagasaki, Japan

[73] Assignee: Mitsubishi Denki Kabushiki Kaisha, Tokyo, Japan

[21] Appl. No.: 387,516

[22] Filed: Jul. 28, 1989

[30] Foreign Application Priority Data

Aug. 6, 1988 [JP] Japan ................... 63-196895

[51] Int. Cl.⁵ .............................................. H04N 7/18
[52] U.S. Cl. ........................................ 358/106; 369/58
[58] Field of Search ................. 358/106, 107, 101, 93; 369/58, 54; 356/237

[56] References Cited

U.S. PATENT DOCUMENTS

| | | | |
|---|---|---|---|
| 4,395,122 | 7/1983 | Southgate et al. | 250/572 X |
| 4,477,890 | 10/1984 | Mooney et al. | 369/58 X |
| 4,812,923 | 3/1989 | Fountain et al. | 369/58 X |

FOREIGN PATENT DOCUMENTS

| | | |
|---|---|---|
| 61-104440 | 5/1986 | Japan . |
| 63-152040 | 6/1988 | Japan . |
| 63-152041 | 6/1988 | Japan . |

OTHER PUBLICATIONS

"The Point of Optical Disc Process Technology", K. K. Japanese Industrial Technology Center; 3-85; pp. 75 & 76.

*Primary Examiner*—James J. Groody
*Assistant Examiner*—Victor R. Kostak
*Attorney, Agent, or Firm*—Wolf, Greenfield & Sacks

[57] ABSTRACT

The apparatus inspects defects on tracks of an object to be inspected such as an optical disc or stamper. The apparatus has a defect detector, a controller for controlling the movement of the object, and a microscope for observing the tracks of the object. Position information on defects is obtained by the detector and, according to this position information, the object is moved so that the defects can be in the visual field of the microscope.

15 Claims, 5 Drawing Sheets

SURFACE DEFECT INSPECTION APPARATUS WITH MICROSCOPE

BACKGROUND OF THE INVENTION

1. Field of the Invention

The present invention relates to a surface defect inspection apparatus for inspecting a defect on a track of a recording medium having a plurality of tracks or of a stamper thereof or the like.

2. Description of Related Art

In a process for manufacturing an optical disc, for example, if any dust is stuck to a surface of a stamper thereof and such a defect 31 on a stamper 21 is formed as shown to be enlarged in FIG. 1, there forms a dented defect 32 of the same configuration at the same position as that of the stamper 21 on a surface of an optical disc 22 made by using the stamper 21 as shown to be enlarged in FIG. 2.

A lot of defects such as 31 and 32, or those of various configurations and sizes, can be formed on the whole surface of the stamper or of the optical disc. However, those defects 31 and 32 are so minute that it is essentially impossible to find them only by visually inspecting the surface of the stamper 21 or of the optical disc 22. In order to inspect those defects, there has been used such a surface defect inspection apparatus as shown in FIG. 3 or FIG. 4. In FIG. 3, an object 1 to be inspected such as the optical disc or the stamper thereof is rotated by a motor 2. Above the object 1 is provided an optical head 11 having a light-emitting and light-receiving surface faced to the surface of the object 1, its output being inputted to a defect position detector 12. A rotating signal of the motor 2 is also inputted to the detector 12, the detector 12 giving the motor 2 a driving signal. Output of the detector 12 is inputted to an indicator 13 such as a printer or a plotter.

If any defect on the track of the object 1 is inspected by this surface defect inspection apparatus, the motor 2 is driven in response to the driving signal from the detector 12 so that the object 1 is rotated. In addition, if the object 1 is moved from the outer periphery to the inner periphery thereof, for example, while light is emitted from the optical head 11 thereto, the optical head 11 detects the reflected light on each track of the object 1 one by one and a signal related to the reflected light is obtained. In other words, a signal related to the configuration of the track of the optical disc is inputted to the detector 12. The detector 12, in connection with the rotation of the motor 2, receives a position signal for specifying the position of the radial direction of the object 1 and the circumferential direction of the track, which is made to be in correspondence to the detecting signal of the optical head 11 so as to be inputted to the indicator 13. The indicator 13, thereby, indicates the condition of the defect on the track of the object 1.

In FIG. 4, the object 1, which is adapted to be rotated by the motor 2, can linearly be moved in the radial direction thereof together with the motor 2 by a straight line driver 3. There is provided closely above the object 1 an automatic focusing microscope 6 having the wide visual field toward the surface of the object 1, its light emitting side being linked to an optical path transfer 14. A television camera 8 is linked to one light emitting side 14a of the optical path transfer 14 and carmeral 7 is linked to the other light emitting side 14b thereof. Output signal from the television camera 8 is sent to a monitor 9 and a printer 10, respectively.

If any defect on the track of the object 1 is inspected by this surface defect inspection apparatus, the object 1 is rotated by the motor 2 as well as moved in the radial direction thereof together with the motor 2 by the straight line driver 3. The microscope 6 is focused on the track of the object 1 by automatic focusing thereof. Each track of the object 1 is moved one by one in the visual field of the microscope 6, thereby, the condition of each track of the object 1 is observed. The image of the observed condition of the track is picked up by the television camera 8, whose output signal is sent to the monitor 9 so as to be indicated therein or to the printer 10 so as to be printed. In addition to the above process, by transferring the optical path transfer 14, the image in the visual field of the microscope 6 can be picked up by the camera 7.

In one conventional apparatus as shown in FIG. 3, a signal corresponding to the defect of the track is obtained from the optical head 11 so that the length of the defect being formed can be detected. There are so few plane defect surfaces that the reflected light from the defect surface can be dispersed, as a result, a signal outputted from the optical head 11 has little variation in the periphery of the defect. Therefore, the apparatus has a disadvantage that the size and configuration of the defect can not be inspected.

In the other conventional apparatus as shown in FIG. 4, since the microscope 6 observes the condition of the track, the size and configuration of the defect can be inspected. However, regardless of whether there is a defect or not, since the whole track of the object 1 is observed by the microscope 6, if the object 1 has few defects, there exists a disadvantage that effective inspection of defects can not be performed, spending useless time for it.

SUMMARY OF THE INVENTION

The foregoing disadvantages are overcome in accordance with the present invention. The surface defect inspection apparatus of the present invention is comprised of a detecting means for detecting the position of defect on a track of an object to be inspected, a moving means for moving the object, a microscope for observing the track of the object, and a controlling means for driving and controlling the moving means. The detecting means detects a defect and sends information of the defect position to the controlling means. The controlling means, in accordance with the information of the defect position, controls the moving means so that the detected defect can be in the visual field of the microscope, whereby the microscope observes the size and configuration of the defect.

In addition to the arrangement as described above, there may be employed another arrangement that information of the defect position is stored in a memory, where information of the defect position is read out, and then the controlling means controls the moving means so that the defect can be in the visual field of the microscope.

It is an object of the invention to provide a surface defect inspection apparatus capable of precisely inspecting the size and configuration of a defect.

It is another object of the invention to provide a surface defect inspection apparatus capable of effectively inspecting a surface in a short time.

It is a further object of the invention to provide a surface defect inspection apparatus wherein after having detected a defect on the whole surface of a sheet of object to be inspected, for example, observation of the defect can successively be performed and the time necessary for the inspection can be reduced.

It is a still further object of the invention to provide a surface defect inspection apparatus which can easily observe a defect by providing a camera for picking up observed images of the microscope and by means of an automatic focusing microscope.

The above and further objects and features of the invention will more fully be apparent from the following detailed description with accompanying drawings.

DESCRIPTION OF THE PREFERRED EMBODIMENTS

Figure 1:
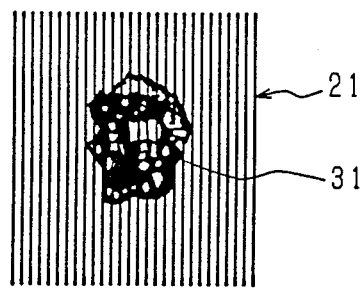
FIG. 1 is an enlarged view of a defect formed on tracks of a stamper.
Figure 2:
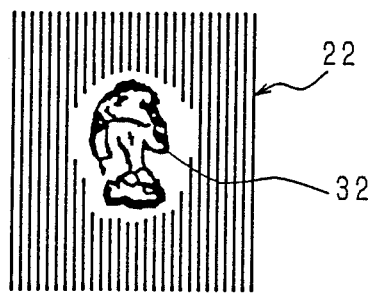
FIG. 2 is an enlarged view of a defect formed on tracks of an optical disc.
Figure 3:
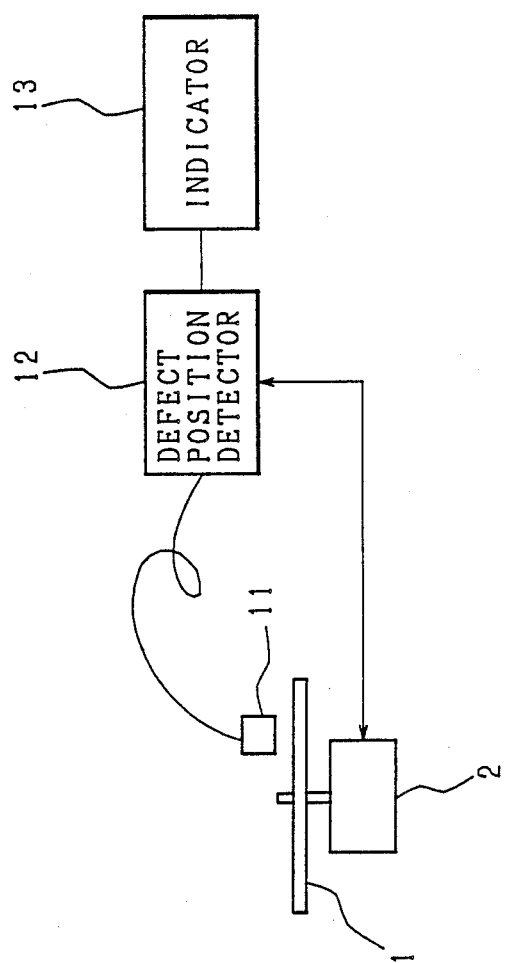
FIGS. 3 and 4 are views showing arrangements of surface defect inspection apparatus of the prior art, respectively.
Figure 4:
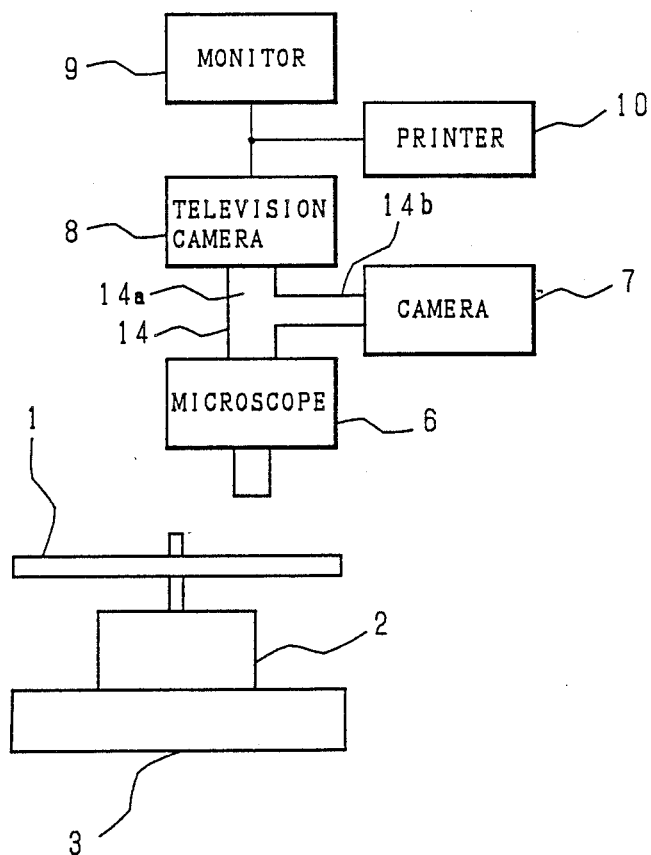
Figure 5:
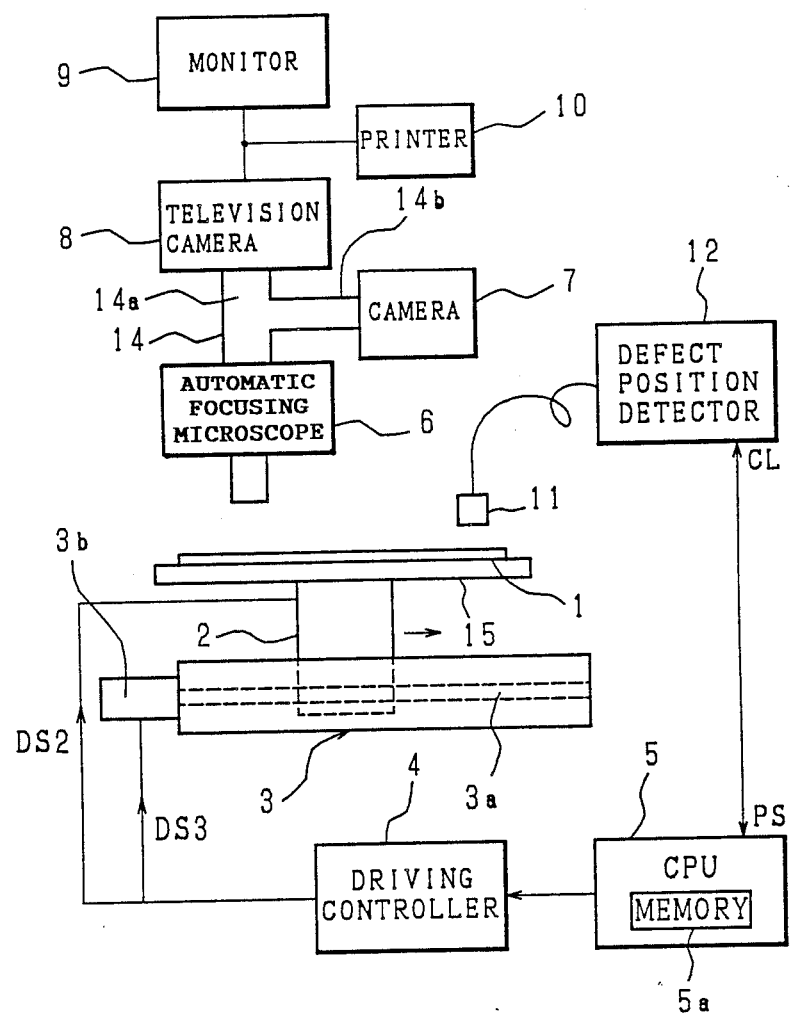
FIGS. 5 and 6 are views showing arrangements of the surface defect inspection apparatus in accordance with the present invention, respectively.

FIG. 5 is a view illustrating an arrangement of the surface defect inspection apparatus in accordance with the present invention. The object 1 such as an optical disc or its stamper wherein a defect on tracks thereof is to be inspected, is removably set on a turn-table 15 which is rotated and driven by the motor 2 for rotating and driving.

The motor 2 is combined with the straight line driver 3 and a lower side of the motor 2 is engaged to a screw axis 3a so that the screw axis 3a is adapted to be driven by a motor 3b for linear driving. In accordance with the rotation of the motor 3b in one direction, the motor 2 moves in the direction of the arrow, and in accordance with the rotation of the motor 3b in the other direction, the motor 2 moves in the direction opposite to the arrow, whereby the object 1 is moved by a proper distance in the radial direction thereof. There is provided above the outer peripheral side of the object 1 the optical head 11 which emits laser beams to the object 1 and then detects the reflected light, whose output is inputted to the defect position detector 12 and is written into an inner memory (not shown). Output of the detector 12, that is, a position signal PS designating information of the defect position (position of the radial direction of the object 1 and the circumferential direction of the track) is inputted to a CPU 5 having a memory 5a. There is inputted from the CPU 5 to the detector 12 a clock signal CL which gives a timing of detecting the output from the optical head 11. The CPU 5 writes the inputted position signal PS into the memory 5a for a time and then outputs it to a driving controller 4 as necessity requires. The output of the controller 4 is sent to the motor 2 and to the motor 3b.

Above one side of the periphery symmetrical to the other side of the periphery of the object 1 above where the optical head 11 is provided, there is disposed the automatic focusing microscope 6 with its visual field being faced toward the surface of the object 1. There is linked the optical path transfer 14 to the light emitting side of the microscope 6 and the television camera (a color television camera or a black-and-white one) 8 is lined to one light emitting side 14a thereof, and the camera 7 to the other light emitting side 14b thereof, respectively. The output of the television camera 8 is sent to the monitor 9 like a monitor television and to the printer 10.

Operation of the apparatus of the present invention having such an arrangement as described above will now be mentioned below. The CPU 5 controls the controller 4 so as to drive the motor 3b first, then the motor 2 is moved in the direction opposite to the arrow so that the optical head 11 is positioned above the most outer periphery of the object 1, and the motor 2 is stopped in that position for a moment. The motor 2, then, is driven in the position so that the basic position being set in the outer periphery of the object 1 is faced to the optical head 11. The CPU 5 outputs such an instruction to the controller 4 so as to send a driving signal DS2 with respect to the motor 2, and in synchronism with the driving signal DS2, outputs the clock signal CL to the detector 12. The detector 12, at the time when the clock signal CL is inputted, makes the optical head 11 emit laser beams as well as detecting the reflected light from the track of the object 1. The motor 3b is driven in response to the driving signal DS3 from the controller 4, and the object 1 is moved in the direction of the arrow, whereby reflected light from each different track is detected one after another.

By way of such operation as described above, the detector 12 detects configurations of all tracks of the object 1, and receives the position signal for specifying the position of circumferential direction of each track, that is, each address of the object 1. Corresponding to the position signal, a signal related to the configuration of the track is written into the inner memory and, the writing of data on configurations of all tracks of the object 1 is completed. Out of the written data, only the position signal of the data having detected the configuration of the track which can be decided to have a predetermined defect thereon (signal more than a predetermined level) is outputted to the CPU 5 so as to be stored in the memory 5a.

The position signal stored in the memory 5a is read out at the predetermined time or in response to the instruction signal so as to be outputted to the controller 4. Responding to the position signal, the controller 4 drives both the motor 2 and the motor 3b so that the track specified in response to the position signal is located in the visual field of the microscope 6. The microscope 6 is focused on the track of the object 1 by automatic focusing operation and the observed image of the microscope 6 is picked up by the television camera 8. The observed image is displayed in the monitor 9, and the displayed image in the monitor 9 is then printed in the printer 10 as necessity requires. It may be possible to pick up the observed image of the microscope 6 by means of the camera 7 by transferring the optical path transfer 14 from one light emitting side 14a to the other side 14b thereof.

Once having completed observation of a defect on the track specified in response to one position signal, in the same way, followed one after another undergoing observation of defects on the other tracks having defects specified in response to the other position signals.

As may be seen from the above description, since defects on tracks of the object 1 can be observed to be enlarged by the microscope 6 or the television camera 8, the size and configuration of defects formed on the object 1 can visually be inspected and the inspection of the object 1 can be undergone with greater accuracy. Since the track position that observes defects is specified in response to the position signal being inputted to the CPU 5, it is needless to observe other tracks having no defect, whereby ensuring effective inspection of the object without spending useless time for it.

Figure 6:
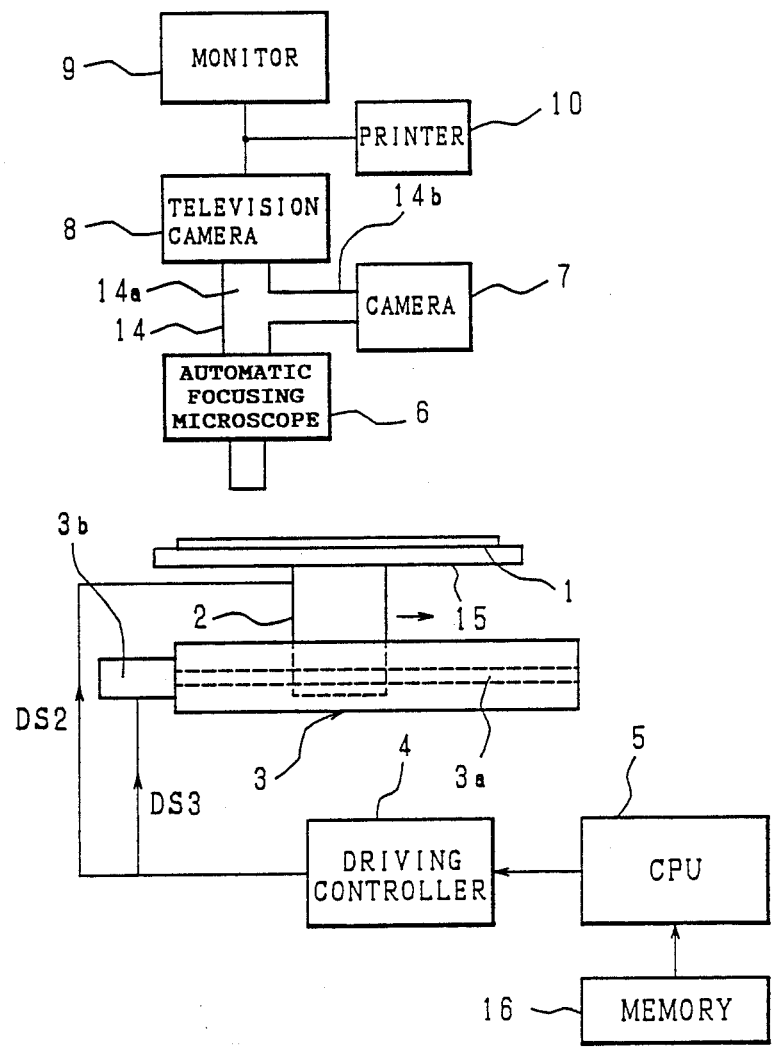

FIG. 6 is a view showing an example of a transformed arrangement of the apparatus in accordance with the present invention, wherein the detector 12 is not connected with the CPU 5 as in such an example as mentioned above. Position information detected by a detecting means is stored in a memory 16 for a time and then, as necessity requires, is read out to the CPU 5 from the memory 16 and, in the same way as in the aforementioned example, the object 1 is moved to a desired position so as to be observed by the microscope 6. This example can have the same effect as the aforementioned example.

In the embodiment of the present invention, the optical head 11 is employed for detection of defects, however, it may be employed in connection with a magnetic head, or an optical head being combined with a magnetic head. Furthermore, the optical head 11, needless to say, may be adapted to be moved from the inner periphery to the outer periphery of the object 1.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A surface defect inspection apparatus, comprising:
   a detecting means for detecting a defect in an object to be inspected having a plurality of tracks,
   a moving means for moving said object,
   a microscope for observing a track of said object, and
   a controlling means for controlling said moving means so that the defect detected by said detecting means can be in the visual field of said microscope.

2. A surface defect inspection apparatus as set forth in claim 1, wherein said tracks are circular and said moving means moves said object in the circumferential direction and in the radial direction thereof.

3. A surface defect inspection apparatus as set forth in claim 1, wherein said detecting means detects the defect of said object while said object is moved by said moving means.

4. A surface defect inspection apparatus as set forth in claim 1, wherein said detecting means outputs position information on the defect to said controlling means.

5. A surface defect inspection apparatus as set forth in claim 4, wherein said controlling means includes a memory for storing said position information.

6. A surface defect inspection appaaratus as set forth in claim 1, wherein said detecting means includes an optical head which projects coherent light on said object and which detects reflected light thereof.

7. A surface defect inspection apparatus as set forth in claim 1, wherein said moving means includes a motor for rotating said object and a motor for linearly moving said object.

8. A surface defect inspection apparatus as set forth in claim 1, wherein said microscope is an automatic focusing microscope.

9. A surface defect inspection apparatus as set forth in claim 1, further comprising a television camera for picking up observed images of said microscope.

10. A surface defect inspection apparatus as set forth in claim 9, further comprising a monitor for displaying the images of said television camera.

11. A surface defect inspection apparatus as set forth in claim 9, further comprising a printer for printing the images of said television camera.

12. A surface defect inspection apparatus as set forth in claim 1, wherein said object is an optical disc or a stamper thereof.

13. A surface defect inspection apparatus, comprising:
   a moving means for moving an object to be inspected having a plurality of tracks,
   a microscope for observing a track of said object, and
   a controlling means for receiving position information on defects of said object and, according to the information, controlling said moving means so that a defect can be in the visual field of said microscope.

14. A surface defect inspection apparatus as set forth in claim 13, wherein said tracks are circular and said moving means moves said object in the circumferential direction and in the radial direction thereof.

15. A surface defect inspection apparatus as set forth in claim 13, further comprising a memory for storing said position information therein.

* * * * *